United States Patent
Mays et al.

(10) Patent No.: US 9,984,573 B2
(45) Date of Patent: May 29, 2018

(54) ADVANCED WARNING SYSTEM

(71) Applicant: Omnitracs, LLC, Dallas, TX (US)

(72) Inventors: Wesley M. Mays, Coppell, TX (US); David Allen Schaller, Ft. Wayne, IN (US); Richard Glasmann, Dallas, TX (US)

(73) Assignee: OMNITRACS, LLC, Dallas, TX (US)

( * ) Notice: Subject to any disclaimer, the term of this patent is extended or adjusted under 35 U.S.C. 154(b) by 63 days.

(21) Appl. No.: 14/935,193

(22) Filed: Nov. 6, 2015

(65) Prior Publication Data
US 2017/0132929 A1    May 11, 2017

(51) Int. Cl.
*B60Q 1/00* (2006.01)
*G08G 1/16* (2006.01)

(52) U.S. Cl.
CPC ............ *G08G 1/161* (2013.01); *G08G 1/166* (2013.01)

(58) Field of Classification Search
CPC ............................... G08G 1/161; G08G 1/166
USPC ................... 340/435; 701/117, 119
See application file for complete search history.

(56) References Cited

U.S. PATENT DOCUMENTS

| | | | |
|---|---|---|---|
| 6,856,896 B2 | 2/2005 | Kushida et al. | |
| 7,979,198 B1* | 7/2011 | Kim | G08G 1/091 |
| | | | 701/117 |
| 9,576,480 B1* | 2/2017 | Shoshan | G08G 1/0112 |
| 2005/0137781 A1* | 6/2005 | Hudson, Jr. | G08G 1/161 |
| | | | 701/117 |
| 2006/0149501 A1* | 7/2006 | Tsalakopoulos | G06Q 40/08 |
| | | | 702/179 |
| 2010/0145570 A1* | 6/2010 | Asahara | G08G 1/207 |
| | | | 701/31.4 |
| 2015/0073639 A1 | 3/2015 | Minarcin et al. | |

FOREIGN PATENT DOCUMENTS

| | | |
|---|---|---|
| EP | 2 065 868 A2 | 6/2009 |
| EP | 2 845 779 A1 | 3/2015 |

OTHER PUBLICATIONS

International Search Report and Written Opinion issued in PCT/US2016/059588 dated Mar. 6, 2017.

* cited by examiner

*Primary Examiner* — Ojiako O Nwugo
(74) *Attorney, Agent, or Firm* — Arent Fox LLP (57) ABSTRACT

Aspects of the present disclosure generally relate to one or more systems, methods, and/or devices for an advanced warning system that alerts drivers of potential upcoming traffic conditions (e.g., accidents or traffic slowdowns) based on active monitoring of vehicle parameters (e.g., speed, braking, air bag deployment, etc.) associated with other vehicles traveling ahead in the same direction. Thus, in some aspects, the advanced warning system may receive, at a network device (e.g., network management center (NMC)), one or more parameters from a first mobile computing platform (MCP) associated with a first vehicle and determine, at the network device, whether a traffic condition has developed on a stretch of highway based on the one or more parameters.

21 Claims, 6 Drawing Sheets

ADVANCED WARNING SYSTEM

BACKGROUND

In recent decades, significant attention has been called to the issue of motor vehicle safety. According to various studies, motor vehicle accidents rank among the top causes of accidental injury or death. On highways, for example, where vehicles are traveling at high speeds, a sudden visibility loss due to rain, dense fog, snow, or forest fire, may result in a multi-vehicle pileup costing significant property damage, injuries, and even death.

Motor vehicle manufacturers have responded to the safety concerns by developing driver assistance systems such as Adaptive Cruise Control (ACC), Forward Collision Warning (FCW) system, Blind Spot Warning System (BSWS), and Lane Departure Warning (LDW) system. Generally, these systems monitor the vehicle environment by taking measurements of objects using radar, laser and/or camera-based sensors to assist the driver.

For example, an ACC system helps drivers maintain a preset distance from the vehicle they are following using a radar module mounted at the front of the vehicle that measures the gap and closing speed to the vehicle ahead. The ACC system may automatically adjust the speed of the car to help maintain a preset distance from the vehicle in front. Similarly, FCW uses a combination of radars, lasers and/or cameras to activate a visual and audible warning when the system detects a high risk of collision with the vehicle in front. BSWS uses side and rear-looking radars and cameras to detect other vehicles around the vehicle, and illuminates an indicator lamp in the side-view mirrors when an object is present in the driver's blind spot. Finally, an LDW system uses small, forward facing camera to monitor lane lines and alerts the driver when an unintentional lane departure is happening.

Accordingly, each of the above-identified systems relies on radars, lasers, cameras, and/or other sensors mounted locally on the vehicle itself. However, if one or more sensors become blocked by snow, ice or mud, each of these systems would be unable to warn the driver or prevent a collision. Furthermore, during adverse weather conditions (e.g., snow, ice or rain), the roads may not provide sufficient traction. Thus, given the short effective range of the conventional systems, even if one of the sensors mounted on the vehicle detects an imminent collision and automatically applies the vehicle brakes, the vehicle may not be able to stop in time to prevent a collision.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The described features of the present disclosure generally relate to one or more systems, methods, device, and/or computer-readable media for an advanced warning system that alerts drivers of potential upcoming traffic conditions (e.g., accidents or traffic slowdowns) based on active monitoring of vehicle parameters (e.g., speed, braking, air bag deployment, etc.) associated with other vehicles traveling ahead in the same direction. Thus, in some aspects, the advanced warning system may receive, at a network device (e.g., network management center (NMC)), one or more parameters from a first mobile computing platform (MCP) associated with a first vehicle and determine, at the network device, whether a traffic condition has developed on a stretch of highway based on the one or more parameters.

If the NMC determines that a traffic condition has developed on a stretch of highway, the advanced warning system may identify other vehicles (e.g., a second MCP associated with a second vehicle) within a proximity threshold to the first vehicle (e.g., a second vehicle traveling in the same direction towards the first vehicle) and transmit a warning notification to the second MCP. In some aspects, the warning notification may include information regarding the traffic condition ahead. In some examples, the advanced warning system may determine the traffic condition by identifying a location of the traffic condition (e.g., whether the condition is on a highway or a local road) and estimate a severity level of the traffic condition. For example, if the NMC determines that the speed of the first vehicle decreased rapidly or if one or more parameters associated with the first MCP indicate that the air bags were deployed on the first vehicle, the advanced warning system may be able to deduce the severity of the accident and transmit appropriate warning notifications to the second MCP that is within the proximity threshold to the first vehicle, and hence likely to encounter the accident or traffic conditions associated therewith.

Additionally or alternatively, the advanced warning system may also monitor, at the NMC, driving activity of the second vehicle following an issuance of the traffic condition warnings (i.e., determine whether the second vehicle is slowing down or taking other remedial actions). If the second vehicle does not respond to the issued warnings, the NMC may escalate the warnings by issuing urgent notifications to the second MCP. In some examples, urgent notifications may include increased volume and/or periodicity of warnings published on the user interface of the second MCP. In some examples, if the driver still fails to respond to any of the issued warnings, the advanced warning system may transmit, from the NMC, one or more control signals to the second MCP that overrides at least one driving capability of the second vehicle. One or more examples of the control signals issued by the NMC to the second MCP may include gradually slowing the vehicle remotely from the network before the second vehicle reaches the location of the traffic condition. Other examples may include remotely activating 4-way flashers on the second vehicle from the NMC.

Accordingly, because the advanced warning system of the present disclosure is not localized on the second vehicle, aspects of the present disclosure provide improvement over the conventional system by alerting the drivers of potential collisions at greater distances (e.g., 50 miles ahead) and allow the drivers to take remedial measures. Furthermore, if the driver fails to respond to the warnings that may be audibly and visually issued on a user interface of the MCP, the advanced warning system is configured to remotely override at least one driving capability of the vehicle to prevent potential collisions.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

As discussed above, conventional driver assist systems, such as radars, lasers, cameras, and/or other sensors mounted locally on the vehicle itself, are ill equipped to provide advance warning to the driver that extends beyond a few feet. Moreover, during adverse weather conditions (e.g., snow, ice or rain), the roads may not provide sufficient traction to allow adequate avoidance maneuvers. Thus, given the short effective range of the conventional systems, even if one of the sensors mounted on the vehicle detects an imminent collision and automatically applies the vehicle brakes, the vehicle may not be able to stop in time to prevent a collision. Such drawbacks are amplified when applied to tractor-trailers or other large trucks that share highways with passenger vehicles. For example, while a typical passenger vehicle weighing 3,000-4,000 pounds and traveling at a speed of 65 miles per hour in ideal conditions may take up to 316 feet to come to a stop (nearly the length of a football field), a fully loaded tractor-trailer weighing 80,000 pounds under similar conditions may take up to 525 feet (i.e., nearly the length of two football fields). Furthermore, in the instance of the tractor trailer, a brake lag distance must also be taken into consideration when calculating the stopping distance. Generally, a brake lag distance may refer to the time it may take for a brake signal to travel to all the wheels on the tractor-trailer before the brakes on the trailer are engaged. Therefore, any deviation from the ideal circumstances may be fatal.

The advanced warning system in accordance with various aspects of the present disclosure overcome the drawbacks of the conventional systems by leveraging information gathered from one or more fleet vehicles to detect a developing traffic condition, and actively warn other vehicles in the vicinity of the potential hazard. For example, a truck fleet management company may employ hundreds or thousands of vehicles, many of which may be on the road at any one time. Aspects of the present disclosure allow a network device (e.g., NMC) to actively and/or periodically gather information (e.g., one or more parameters) from these fleet vehicles to make the necessary assessments in detecting a traffic condition on the road and issuing advance warnings to other vehicles (e.g., other trucks) that may be headed in the direction of the detected condition.

In some aspects, the network device may actively monitor the one or more parameters from a first set of vehicles in order to issue a warning to a second set of vehicles. Such information may include one or more parameters selected from a group consisting of: speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pretensioner deployment forward vision system input, depressed driver emergency button, tire-pressure monitoring system, automatic traction control, or a biometric parameter of a driver.

Therefore, in application, the advanced warning system may receive, at a network device one or more parameters from a first MCP associated with a first vehicle and determine, at the network device, whether a traffic condition has developed on a stretch of highway based on the one or more parameters. If the network device determines that a traffic condition has developed on a stretch of highway, the advanced warning system may identify other vehicles (e.g., a second MCP associated with a second vehicle) within a proximity threshold to the first vehicle (e.g., a second vehicle traveling in the same direction towards the first vehicle) and transmit a warning notification to the second MCP.

It should be understood by those of ordinary skill in the art that the identification of the traffic condition is not limited to only the one or more parameters from the vehicles. Instead, the network device may also receive information regarding the traffic condition from an alternative source. For example, the alternative source may comprise at least one of a government vehicle, a traffic report, a traffic camera, automated highway status report and/or news report. Thus, the network device may be able to identify and/or correlate the detected traffic condition based on the information gathered from an alternative source. Such cross-referencing may allow the network device to assign a confidence factor (e.g., a confidence factor value) to the detected traffic condition. In some examples, the confidence factor may identify a level of confidence that the network device has that the traffic condition is a hazardous condition. Such determination may allow the network device to distinguish between conditions where a vehicle is stopped at the side of a road for maintenance issues or where a vehicle is involved in a traffic accident, a roadway impediment (e.g., rock slide, mud slide, erosion of road surface) or slowdown on the traveling lanes of the highway.

Various aspects will now be described with reference to the drawings. In the following description, for purposes of explanation, numerous specific details are set forth in order to provide a thorough understanding of one or more aspects. It should be understood, however, that such aspect(s) may be practiced without these specific details.

Figure 1:
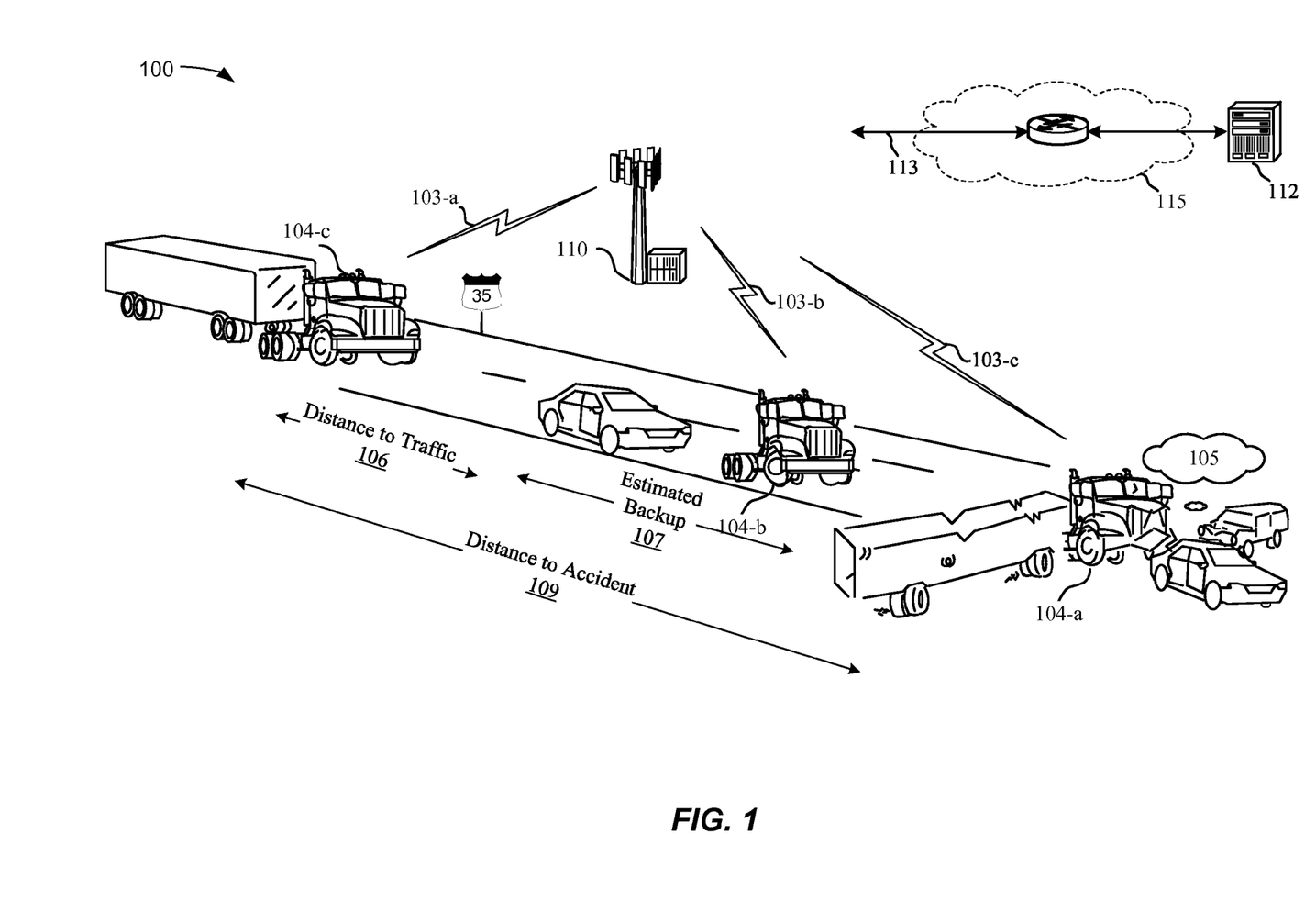
FIG. 1 illustrates a wireless communication system implementing various aspects of the present disclosure to provide advanced warning to one or more vehicles of potential traffic condition.

FIG. 1 illustrates one example of a wireless communication system 100 for implementing advanced warning capability for one or more vehicles in accordance with various aspects of the present disclosure. In some examples, the wireless communication system 100 may include one or more fleet vehicles 104 travelling on a stretch of highway 35. The term "highway" may be associated with any public road, including, but not limited to interstate highways, freeways, autobahn, autoroute, etc. The one or more fleet vehicles 104 may be in communication with a network device 112 via a base station 110. Specifically, the network device (e.g., NMC) 112 may be configured to communicate with one or more vehicles 104 via a mobile computing platform (MCP) (not shown) located on each vehicle 104 or associated with each driver of each vehicle 104. An example of an MCP includes, but is not limited to, an MCP 50, an MCP 100, an MCP 110, an MCP 200, and a TT210 sold by Omnitracs, LLC of Dallas, Tex. Accordingly, the MCP and the network device 112 may exchange data via a wireless communication link 103 and backhaul link 113 by utilizing one or more base stations 110, access points (APs) (not shown), and/or satellite communication (not shown). The network device 112 may provide user authentication, access authorization, tracking, internet protocol (IP) connectivity, advanced warning, and other access, routing, or mobility functions.

In some aspects, the network device 112 may actively monitor and receive one or more parameters from a first MCP associated with a first vehicle 104-a and determine whether a traffic condition 105 (e.g., traffic accident or slowdown) has developed on a stretch of highway 35 based on the one or more parameters. As illustrated in the example of FIG. 1, the first vehicle 104-a may be directly involved in a traffic condition 105 (e.g., traffic accident) on the stretch of highway 35. In such instance, the network device 112 may be able to determine that the first vehicle 104-a has in fact been involved in a traffic condition 105 based on observing rapid deceleration, braking, air bag deployments, and/or seat belt pre-tensioner deployment forward vision system input associated with the first vehicle 104-a that are indicative of a traffic accident from the one or more parameters received from the first vehicle 104-a.

In some aspects, upon identifying an existence of a hazardous traffic condition 105, the network device 112 may further identify the geographical location (e.g., latitude and longitude coordinates and/or approximate mile marker) of the traffic condition 105 by utilizing a global positioning system (GPS) and/or triangulating the position based on determining which base station(s) 110 received the signal 103-c associated with the one or more parameters from the first MCP.

Additionally or alternatively, the network device 112 may estimate a severity level of the traffic condition 105 based on the one or more parameters. For example, if the one or more parameters indicate a likely collision or accident (as opposed to a traffic slowdown), the network device 112 may increase the severity level of the traffic condition 105. In some aspects, the network device 112 may also adjust the severity level based on information from other MCPs (e.g., MCP associated with vehicle 104-b) within the proximity threshold of the first vehicle 104-a. For example, although vehicle 104-b may not itself involved in the collision, the one or more parameters associated with the vehicle 104-b may be able to report at least one abnormal operating condition. For instance, the one or more parameters associated with vehicle 104-b may report reduced speed, activation of 4-way flashers, and/or minimal or zero revolutions per minute (RPM) may indicate that the traffic condition 105 is such that the traffic has reduced to a crawl or complete stop.

Accordingly, the network device 112 may also utilize the determination of the traffic condition 105 and the severity level to transmit warning notifications to the one or more second vehicle(s) (e.g., 104-c) within a proximity threshold to the first vehicle 104-a. In some aspects, the proximity threshold may range from a few feet (e.g., 10 feet) to one or more miles (e.g., 1-50 miles). Additionally or alternatively, identifying second vehicle(s) within the proximity threshold may also include determining the direction of travel of the first vehicle 104-a and the direction of travel of the second vehicle(s) 104-c. Therefore, in an aspect, alerting the second vehicle 104-c may comprise transmitting an advance warning notification to the second MCP(s) (not shown) associated with the second vehicle(s) 104-c regarding the traffic condition 105 that are within the proximity threshold of the first vehicle 104-a and are traveling in the same direction of travel as the first vehicle 104-a but not past the location of the first vehicle 104-a. In other words, the present aspects will alert the second vehicle 104-c if it is approaching the location of the traffic condition 105. In some aspects, such determination of second vehicle(s) 104-c traveling in the same direction of travel as the first vehicle 104-a may prevent the network device 112 from alerting traffic traveling in the opposite direction, which may not be affected by the traffic condition 105, although in other aspects any vehicle traveling in any direction that is approaching the location of the traffic condition 105 may be alerted.

Although the example illustrated in FIG. 1 involves coordinating the warning notifications from the network device 112, it should be understood by those skilled in the art that transmitting the warning notification to the second MCP may comprise transmitting the warning notification from the first MCP of the first vehicle 104-a to the second MCP of the second vehicle 104-c in a peer-to-peer (P2P) communication without the input of the network device 112. Thus, in some examples, the first MCP of the first vehicle 104-a may be able to directly notify the second MCP of the second vehicle 104-c of the traffic condition 105.

In some aspects, transmitting the advance warning notification to the one or more second MCP(s) associated with the second vehicle(s) 104-c may be based on determining whether the severity level of the traffic condition satisfies a severity threshold. Therefore, the network device 112 may transmit the warning notification to the second MCP only if the severity level of the traffic condition exceeds the severity threshold. Alternatively, if the severity level of the traffic condition is less than the severity threshold, the network device 112 may elect to forego issuing a warning notification to the second MCP(s).

In some examples, the network device 112 may also utilize the severity level to identify estimated backup 107 that may result from the traffic condition 105. For example, based on the severity level, the elapsed time since the detection of the traffic condition 105, and/or time of the day (e.g., during rush hour or off peak hours), the network device 112 may be able to estimate the backup 107 that may result from the traffic condition 105. Accordingly, the network device 112 may not only transmit a warning notification to the second MCP associated with the second vehicle 104-c, but may also include information such as distance to the traffic condition 109 and distance to the traffic 106 in order to allow sufficient time for the second vehicle 104-c to take remedial measures (e.g., begin slowing down prior to approaching traffic or seeking alternative routes around the traffic condition 105).

Upon issuing a warning notification to the second MCP associated with the second vehicle 104-c, the network device 112 may actively monitor the driving activity of the second vehicle 104-c to determine whether the second vehicle 104-c has responded to the warning notification based on the driving activity (e.g., started to slow down). If the network device 112 determines that the second vehicle 104-c has failed to adequately respond to the warning notifications, the network device 112 may initiate transmitting urgent notification(s) to the second MCP that may include audible, visual, and/or haptic warnings that intensify as the distance to traffic condition 109 continues to decrease. In some aspects, the network device 112 may continuously monitor the driving activity of the second vehicle 104-c based on the one or more parameters being received, and in the event that the network device 112 that the second vehicle 104-c has continuously failed to respond to the issuance of the urgent notification(s), the network device 112 may further be configured to transmit a control signal to the second MCP that may override at least one driving capability of the second vehicle 104-c. For example, the network device 112 may be configured to remotely activate 4-way flashers and begin automatically applying brakes of the second vehicle 104-c without the input of the driver.

Although in the illustrated example of FIG. 1, the first MCP associated with the first vehicle 104-a is involved in the traffic collision, it should be understood by those of ordinary skill that the network device 112 may be able to identify the traffic condition 105 based on the one or more parameters of other vehicle(s) (e.g., vehicle 104-b) without the parameters available from the vehicles involved in the accident itself (e.g., if the traffic condition does not involve any vehicles with available MCPs). In such instance, the vehicle 104-b may be classified as the "first vehicle" upon which the network device 112 determines whether a traffic condition 105 is present on the stretch of highway 35. As a result, in some aspects, the network device 112 may identify a second MCP associated with a second vehicle 104-c in proximity threshold of the vehicle 104-b, and issue warning notifications to the second MCP accordingly.

Figure 2:
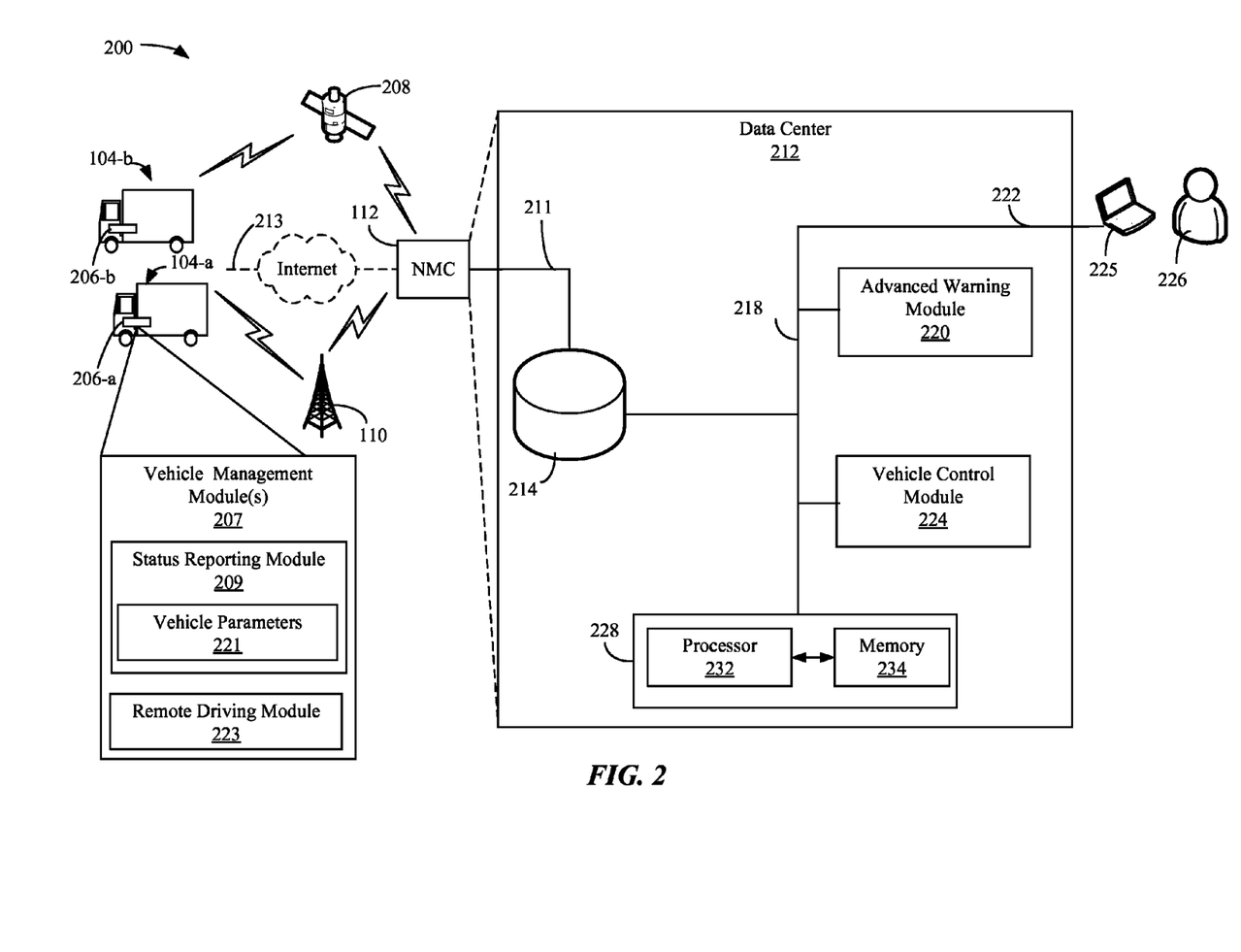
FIG. 2 is a functional block diagram of example elements of an aspect of a system including an advanced warning module configured to identify traffic conditions based on parameters received from one or more MCPs and issue warnings to other vehicles in the proximity to the identified traffic condition.

Referring now to FIG. 2, in an aspect, a system 200 includes modules for implementing advanced warning system in vehicle operation as illustrated in FIG. 1 above. As used herein, the term "module" may one of the parts that make up a device, may be hardware or software or firmware, and may be divided into other modules and/or distributed across one or more processors.

In an aspect, system 200 can comprise a network management center (NMC) 112 configured to communicate with one or more vehicles 104 via a mobile computing platform (MCP) 206 located on each vehicle 104 or associated with each driver of each vehicle 104. The system 200 may include one or more fleets of vehicles 104, each fleet having at least one vehicle. Typically, a fleet could include as many tens, hundreds or thousands of vehicles. An example fleet 204 is illustrated as having two vehicles 104. Additional fleets (not shown) are contemplated, but not shown. In implementations, each MCP 206 is configured to collect and transmit data associated with the operation of the vehicle 104 to the NMC 112. In an aspect, vehicle management module(s) 207 may be implemented as a software application defined by code or instructions stored in a computer-readable medium and executed by a processor, and/or as hardware (e.g., a specially programmed processor module), and/or as firmware. According to the present aspects, one of the vehicle management module module(s) 207 may include collect and report one or more parameters 221 associated with the vehicle 104 and/or driver to NMC 112, as will be discussed in more detail below.

In some examples one or more parameters associated with the vehicle may be selected from a group consisting of: speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pre-tensioner deployment forward vision system input, depressed driver emergency button, tire-pressure monitoring system, or automatic traction control. Additionally or alternatively, the one or more parameters associated with the driver may include a biometric parameter (e.g., heart rate) of a driver.

In some implementations, MCP 206 may include a processor configured to execute one or more vehicle management module(s) 207 and establish communication with external devices such as NMC 112 via a communication network. The MCP 206 may also include a memory configured to store computer-readable code that may define all or part of the modules 207 and also to store data associated with the components and/or MCP 206. MCP 206 may also include a user interface or display, a mobile application server, and a communications module (e.g., including the one or more transceivers, and one or more of terrestrial and Wi-Fi modems, one or more antennae, a GPS module, and a satellite communications module). For example, in an aspect, MCP 206 may include, but is not limited to, an MCP 200 platform sold by OMNITRACS LLC of Dallas, Tex. In some examples, the vehicle management module(s) 207 associated with MCP(s) 206 may include a status reporting module 209 for periodically transmitted the one or more vehicle parameters 221 to the NMC 112. The vehicle management module(s) 207 may also include a remote driving module 223 for overriding at least one driving capability of the vehicle 104 based on a control signal received from the NMC 112, and more specifically from the vehicle control module 224 when the vehicle 104 fails to respond to the warning notifications received from the data center 212 as discussed below.

As an example only, each vehicle 104 may be in bi-directional communication with NMC 112 over at least one communication channel. In the example shown in FIG. 2, each vehicle 104 is in bi-directional communication with the NMC 112 over at least one of a satellite-based communication system 208 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 213 through the Internet). Depending on many factors, data may be exchanged with the vehicles 104 using one or both of the satellite communication system 208 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be thought of as a data clearinghouse that receives all data that is transmitted to and received from the vehicles 104. Moreover, in an aspect, NMC 112 may include one or more back-end servers. Thus, in some aspects, the collected information (e.g., vehicle parameters 221) may periodically (e.g., every x minutes, where x is a whole number, or once a day, or upon availability of a wired or wireless connection) be transmitted from the MCP 206 to the NMC 112 for analysis and record keeping.

The system 200 also includes a data center 212, which may be part of or in communication with NMC 112. The data center 212 illustrates one possible implementation of a central repository for all of the data received from each of the vehicles 104. As an example, as mentioned above many different types of data are transmitted from the vehicles 104 to the NMC 112. In the case where data center 212 is in communication with NMC 112, the data may be transmitted via connection 211 to the data center 212. The connection 211 may comprise any wired or wireless dedicated connection, a broadband connection, or any other communication channel configured to transport the data. Moreover, in an aspect, data center 212 may include one or more back-end servers analyzing the one or more parameters transmitted from the one or more MCP(s) 206. Additionally or alternatively, data may also be exchanged between the plurality of MCP(s) 206 using, for example, peer-to-peer (P2P) communication without the involvement of the NMC 112.

In an aspect, the data center 212 may include a data warehouse 214 for receiving the data from vehicles 104 relating to vehicle and/or driver performance (e.g., driver biometric data). In an aspect, for example, data center 212 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers.

In one aspect, the data center 212 may include an advanced warning module 220 for analyzing one or more vehicle parameters 221 transmitted periodically by the first MCP 206-a, and determining whether a traffic condition exists based on the one or more vehicle parameters 221. The advanced warning module 220 may further be configured to identify one or more second vehicles 104-b (also e.g., second vehicle 104-c in FIG. 1) that are within a proximity threshold of the first vehicle 104-a, and issue warning notifications to the second MCP 206-b associated with second vehicle 104-b in the vicinity of the traffic condition and traveling in the same direction as the first vehicle 104-a. In some examples, if the advanced warning module 220 detects a traffic condition, the advanced warning module 220 may further estimate a severity level of the traffic condition based on the one or more vehicle parameters 221. In some aspects, the advanced warning module 220 may determine whether the severity level of the traffic condition satisfies a severity threshold, and transmit the warning notification to the second MCP 206-b if the severity level of the traffic condition exceeds the severity threshold.

Additionally or alternatively, the advanced warning module 220 may associate a confidence level to the detected traffic condition. For example, the advanced warning module 220 may assign a confidence factor to the traffic condition that identifies a level of confidence that the network device may have that the traffic condition is a hazardous condition. Accordingly, in some aspects, the advanced warning module 220 may adjust (e.g., increase or decrease) the confidence factor based on identifying a number of MCPs (associated with different vehicles) that may be reporting at least one abnormal operating condition within the proximity of the first vehicle 104-a. Associating a confidence factor to the detected traffic condition may be important in order to differentiate between, for example, a vehicle 104 that is stopped on a side of highway because there is a mechanical issue (e.g., flat tire) versus a vehicle 104 that is actually involved in a traffic accident/slowdown on travelling lanes.

Therefore, in order to avoid erroneously issuing warning notifications to other vehicles of a traffic condition that may not be present, the advanced warning module 220 may assign a confidence factor to the traffic condition, and determine whether to transmit a warning notification if the confidence factor satisfies a confidence threshold. In determining a confidence factor, the advanced warning module 220 may identify a number of MCP(s) that may be reporting at least one abnormal operating condition within the proximity of the first vehicle 104-a and determines whether the number of MCPs reporting at least one abnormal operating condition satisfies a threshold. In some aspects, the advanced warning module 220 may increase the confidence factor based on the determining that the number of MCPs reporting at least one abnormal operating condition exceeds the threshold.

In some aspects, the advanced warning module 220 may also take weather conditions at a location of the first vehicle (e.g., near detected traffic condition) when adjusting the confidence factor. For example, if the advanced warning module 220 determines that the identified location of the traffic condition is experiencing adverse weather (e.g., heavy rain or snow), the advanced warning module 220 may be able to increase the confidence factor that the detected traffic condition may in fact be hazardous. The advanced warning module 220 may be able to gather the weather information from alternative source (e.g., news reports, traffic cameras) or from the one or more vehicle parameters 221 directly. For example, if the one or more vehicle parameters 221 indicates that the windshield wipers are activated, the advanced warning module 220 may be able to deduce that there may be snow or rain at the location of the first vehicle 104-a. Similarly, for example, if the advanced warning module 220 detects that the fog lights of the first vehicle 104-a are turned on based on the one or more vehicle parameters 221 transmitted to the NMC 112, the advanced warning module 220 may make an inference that there may be low visibility at the location of the first vehicle 104 and the detected traffic condition. Based on such information, the advanced warning module 220 may be able to adjust (i.e., increase or decrease) the confidence factor associated with the detected traffic condition, and issue a warning notification to the second MCP 206-b associated with second vehicle 104-b accordingly.

In some examples, the data center 212 may further include a vehicle control module 224 for overriding at least one driving capability of the vehicles 104 based on a failure of the driver of the vehicle 104 to respond to the issuance of the warning notifications issued by the advanced warning module 220. In some aspects, the vehicle control module 224 may actively monitor the driving activity of the second vehicle 104-b following an issuance of the warning notification, and determine whether the second vehicle 104-b has responded to the warning notification based on the driving activity. In the event that the second vehicle 104-b fails to respond to the warning notifications, and more particularly the urgent notifications, the vehicle control module 224 may transmit a control signal to the second MCP 206-b that may override at least one driving capability of the second vehicle 104-b. In some aspects, the control signal transmitted by the vehicle control module 224 may be processed by the remote driving module 223 of the vehicle 104. The remote driving module 223, upon receiving the control signal from the vehicle control module 224, may, for example, deactivate the ability of the driver to accelerate, and in limited circumstances may also remotely begin applying brakes of the second vehicle 104-b if the distance between the traffic condition and the second vehicle 104-b continues to decrease without action.

In some aspect, the advanced warning module 220 and/or vehicle control module 224 may further communicate with a terminal device 225 that can be a user interface portal, a web-based interface, a personal computer (PC), a laptop, a personal data assistant (PDA), a smart phone, a dedicated terminal, a dumb terminal, or any other device over which a user 226, such as a manager or operator responsible for monitoring a fleet of vehicles 104, can view the display or receive a printed report provided by advanced warning module 220 and/or vehicle control module 224.

In an aspect, advanced warning module 220 and/or vehicle control module 224 may be an analysis engine defined by or operating via a processing system 228, for example, connected via a system bus. In an aspect, the processing system 228 includes a processor 232 and a memory 234. In an example implementation, the functionality of advanced warning module 220 and/or vehicle control module 224 as described herein may be implemented in one or more hardware or firmware processor modules of processor 232. For instance, although illustrated as being separate components, advanced warning module 220 and vehicle control module 224 may be a part of or in communication with processor 232. In another example implementation, the memory 234 can store the routines or functionality, e.g., in the form of computer-readable code or instructions, and/or the corresponding data, that are associated with advanced warning module 220 and/or vehicle control module 224. In an aspect, the processor 232 can execute the stored routines (e.g., code) to implement the functionality of advanced warning module 220 and/or vehicle control module 224 that are described herein. Although shown as residing within the data center 212, the processing system 228 may reside elsewhere, and may be implemented as a distributed system in which the processor 232 and the memory 234 may include one or more processor and memories, and may be located in different places, such as at NMC 112 and/or one or more servers associated with NMC 112 or data center 212.

Figure 3:
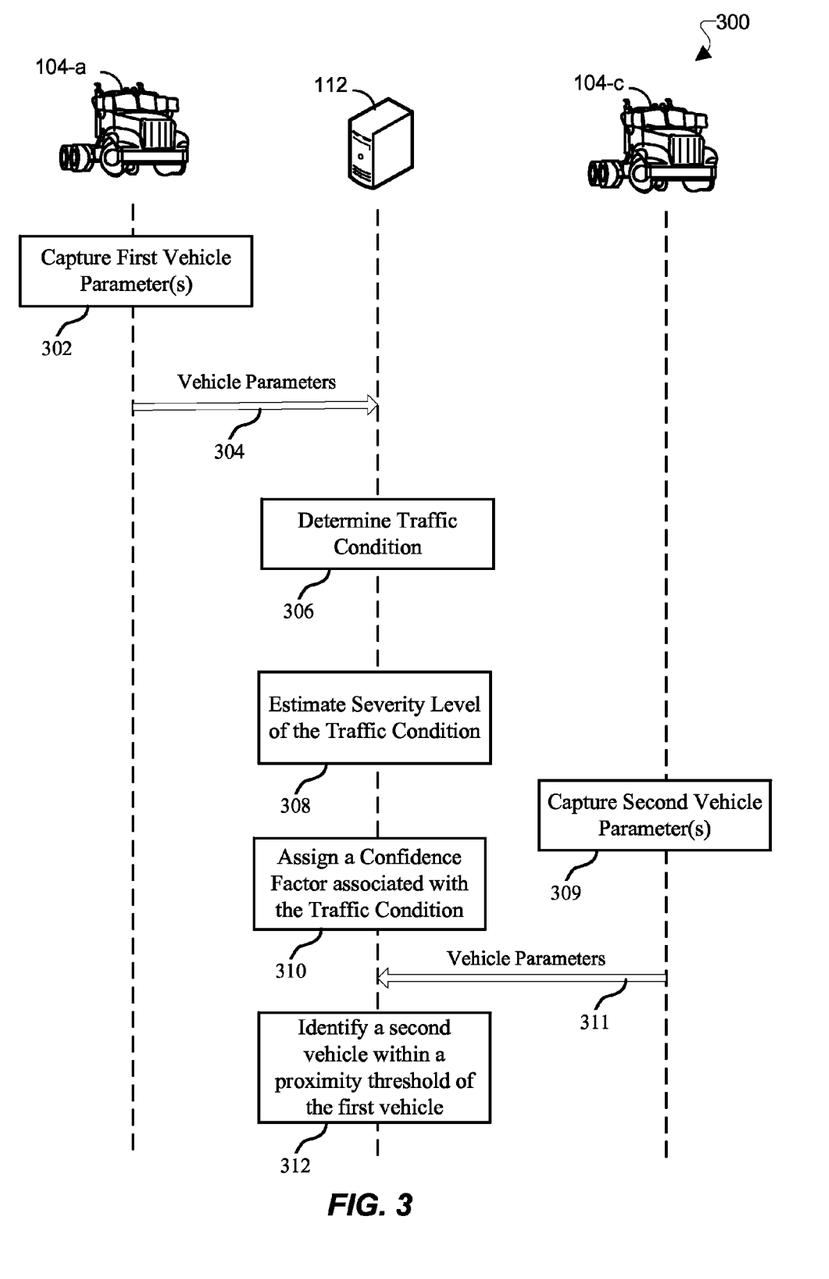
FIG. 3 is a flowchart of an aspect of a method of an advanced warning system for determining whether a traffic condition exists based on one or more parameters received from a first vehicle in accordance with the present disclosure, and for identifying a second vehicle within proximity of the first vehicle.
Figure 4:
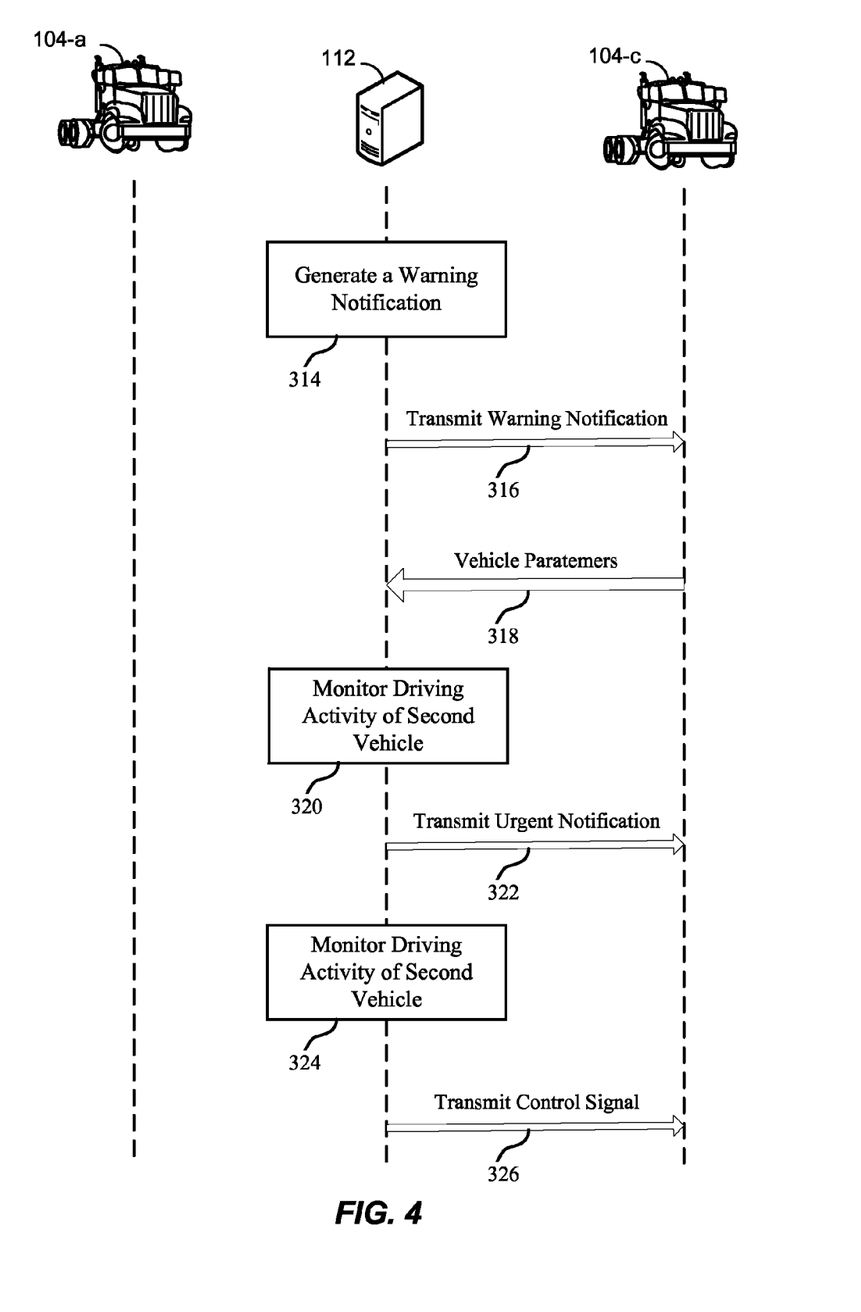
FIG. 4 is a flowchart of an aspect of a continuation of the method of an advanced warning system of FIG. 3, but further for issuing warning notifications to other vehicles, such as the second vehicle, in order to alert the other vehicles of the traffic condition in accordance with the present disclosure.

FIGS. 3 and 4 illustrate one example of a method 300 of implementing an advanced warning system in accordance with various aspects of the present disclosure. The method 300 may include interaction between a first vehicle 104-a, the NMC 112 and a second vehicle 104-b. As discussed above, each vehicle 104 may include a MCP 206.

In some aspects, at 302, a first MCP 206 associated a first vehicle 104-a may capture one or more vehicle parameter(s) associated with the first vehicle 104-a. The one or more vehicle parameters captured by the MCP 206 may include speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pre-tensioner deployment forward vision system input, depressed driver emergency button, tire-pressure monitoring system, automatic traction control, roll stability notice, detection of a vehicle stop without brake actuation, lane departure warning, lane departure loss of line detection, or a biometric parameter of a driver associated with the first vehicle 104-a.

At 304, the NMC 112 may receive the one or more parameters from the first MCP 206 associated with the first vehicle 104-a. In some examples, the NMC 112 may receive the one or more parameters wirelessly over a cellular networks, Wireless local area network (WLAN), and/or via satellite communication.

At 306, the NMC 112 may determine whether a traffic condition is present based on the one or more parameters. In some aspects, determining whether the traffic condition is present may include determining whether the observed parameters are indicative of traffic condition developing on the travelling lanes of a highway or simply the first vehicle stopping, for example, at a rest stop or the side of the highway for maintenance issues.

In order to distinguish whether the observed parameters are indicative of traffic condition developing on the travelling lanes of a highway, the NMC 112, at 308 may estimate severity level of the traffic condition based on the one or more parameters. Additionally or alternatively, the NMC 112, at 310, may assign a confidence factor associated with the detected traffic condition. In some examples, assigning a confidence factor may include identifying a level of confidence that the NMC 112 may have that the traffic condition is a hazardous condition (e.g., traffic accident and/or slowdown). In order to make such a determination, the NMC 112 may identify a number of other MCP(s) 206 that may be reporting at least one abnormal operating condition within the proximity of the first vehicle, and determining whether the number of MCP(s) 206 reporting at least one abnormal operating condition satisfies a threshold. In some example, if the number of MCP(s) reporting at least one abnormal operating condition exceeds the threshold, the NMC 112 may increase the confidence factor associated with the traffic condition.

Additionally or alternatively, the NMC 112 may rely on alternative sources to verify whether the traffic condition is present on the travelling lanes of the highway. For example, the NMC 112 may additionally source government vehicle(s), traffic reports, traffic cameras and news reports in the vicinity of the first vehicle 104-a to confirm or reject the detection of traffic condition. As such, in some aspects, the NMC 112 may adjust the confidence factor associated with the traffic condition by increasing or decreasing the confidence level based on the additional information. In some examples, the NMC 112 may also determine the weather conditions near the first vehicle 104-*a* in analyzing the confidence factor associated with the traffic condition. For example, if the NMC 112 detects that the location of the traffic condition is experiencing adverse weather (e.g., snow and/or rain), it is more likely that traffic condition may be hazardous.

Concurrently, while the NMC 112 is identifying the traffic condition, the second vehicle 104-*c*, at 309, may generate one or more vehicle parameters associated with the second vehicle and transmit, at 311, the one or more second vehicle parameters to the NMC 112. The one or more second vehicle parameters may be similar to those generated and transmitted by the first vehicle 104-*a*.

Upon determining that the traffic condition is in fact present on the traveling lanes of the highway based on the one or more parameters received from the first MCP associated with the first vehicle 104-*a*, the NMC 112, at 312, may identify one or more second vehicle(s) 104-*c* within a proximity threshold to the first vehicle 104-*a*. In some aspects, in identifying the one or more second vehicle(s) 104-*c* within the proximity threshold to the first vehicle 104-*a*, the NMC 112 may further consider the direction of travel of both the first vehicle 104-*a* and the second vehicle 104-*c*. Because the traffic travelling in the opposite direction of the traffic condition may not be affected, it may be unnecessary for the NMC 112 to issue warning notifications to other vehicles travelling in the opposite direction. In some aspects, identifying the one or more second vehicle(s) 104-*c* may be based on the one or more second vehicle parameters transmitted by the second vehicle(s) 104-*c* that may include the location information and the direction of travel information therein.

Discussion of the method 300 is further continued in reference to FIG. 4, which illustrates generating, and transmitting a warning notification, and then monitoring the response of warned vehicles. In some aspects, upon identifying one or more second vehicle(s) 104-*c* within a proximity threshold of the first vehicle 104-*a* (FIG. 3, #312), the method 300 may, at 314, include generating a warning notification for the second MCP 206 associated with the second vehicle 104-*c*. In some aspects, the warning notification may additionally include information regarding the traffic condition, location of the traffic condition, a severity of the traffic condition, a confidence factor of the traffic condition, an estimated delay associated with the traffic condition, and/or an alternative route for the second vehicle 104-*c* to utilize in order to avoid the traffic condition.

At 316, the NMC 112 may transmit the generated warning notification to the second MCP 206 associated with the second vehicle 104-*c*. Following issuance of the warning notification, the NMC 112 may, at 318, continue to receive one or more parameters from the second vehicle 104-*c*. In some aspects, the one or more vehicle parameters may be transmitted from the second MCP 206 associated with the second vehicle 104-*c* may be in real-time such that the NMC 112 may monitor, at 320, the driving activity of the second vehicle 104-*c*. In monitoring the driving activity of the second vehicle 104-*c*, the NMC 112 may determine whether the second vehicle has responded to the warning notification based on the one or more parameters received from the second vehicle 104-*c*. If, at 320, the NMC 112 determines that the second vehicle 104-*c* has not responded to the warning notification, the NMC 112 may further transmit, at 322, an urgent notification to the second MCP 206. The urgent notification may include increasing the intensity and frequency of warning. In some examples, the urgent notifications may include visual, audible and haptic response notifications that may increase in intensity. For example, the urgent notifications may include increasing the volume of the audible warning, initiating haptic response to alert the driver, and/or start flashing the visual warnings.

If, following issuance of urgent notification(s) 322, the NMC 112, at 324 detects that second vehicle 104-*c* has not adjusted its driving activities based on active monitoring of the second vehicle 104-*c*, the NMC 112 may, at 326, transmit a control signal to the second MCP 206 that may override at least one driving capability of the second vehicle 104-*c*. In some examples, overriding at least one driving capability of the second vehicle 104-*c* may include deactivating cruise control, if applicable, and/or remotely reducing the vehicle speed.

Figure 5:
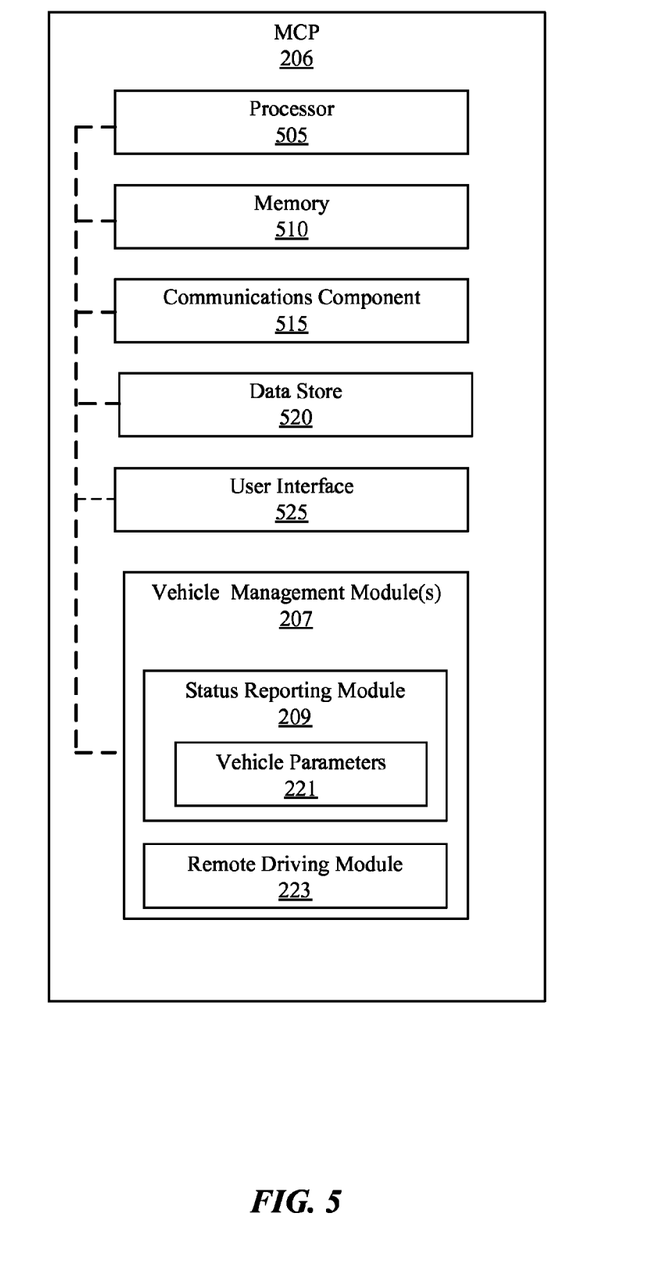
FIG. 5 is a block diagram of an example of an aspect of a mobile computing platform (MCP) in accordance with the present disclosure.

Referring to FIG. 5, in an example that should not be construed as limiting, MCP 206 may include additional components that operate in conjunction with vehicle management module(s) 207, which may be implemented in specially programmed computer readable instructions or code, firmware, hardware, or some combination thereof.

In an aspect, features described herein with respect to the functions of vehicle management module(s) 207 may be implemented in or executed using one or any combination of processor 505, memory 510, communications module 515, and data store 520. For example, vehicle management module(s) 207 may be defined or otherwise programmed as one or more processor modules of processor 505. Further, for example, vehicle management module(s) 207 may be defined as a computer-readable medium (e.g., a non-transitory computer-readable medium) stored in memory 510 and/or data store 520 and executed by processor 505. Moreover, for example, inputs and outputs relating to operations of vehicle management module(s) 207 may be provided or supported by communications module 515, which may provide a bus between the modules of computer device or an interface for communication with external devices or modules. In some aspects, and as discussed above, the vehicle management module(s) 207 may include status reporting module 209 for capturing and transmitting one or more vehicle parameters 221 associated with a vehicle and driver. In some aspects, the one or more vehicle parameters 221 may include speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pre-tensioner deployment forward vision system input, depressed driver emergency button, tire-pressure monitoring system, automatic traction control or a biometric parameter of a driver.

Additionally or alternatively, the vehicle management module(s) 207 may further include remote driving module 223 for overriding and/or disabling at least one driving capability of the vehicle associated with the MCP 206. Processor 505 can include a single or multiple set of processors or multi-core processors. Moreover, processor 505 can be implemented as an integrated processing system and/or a distributed processing system.

Memory 510 may operate to allow storing and retrieval of data used herein and/or local versions of applications and/or software and/or instructions or code being executed by processor 505, such as to perform the respective functions of vehicle management module(s) 207 described herein. Memory 510 can include any type of memory usable by a computer, such as random access memory (RAM), read only memory (ROM), tapes, magnetic discs, optical discs, volatile memory, non-volatile memory, and any combination thereof.

Communications module 515 is operable to establish and maintain communications with one or more internal components/modules or external devices utilizing hardware, software, and services as described herein. Communications component 515 may carry communications between modules on MCP 206, as well as between user and external devices, such as devices located across a communications network and/or devices serially or locally connected to MCP 206. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

MCP 206 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

Figure 6:
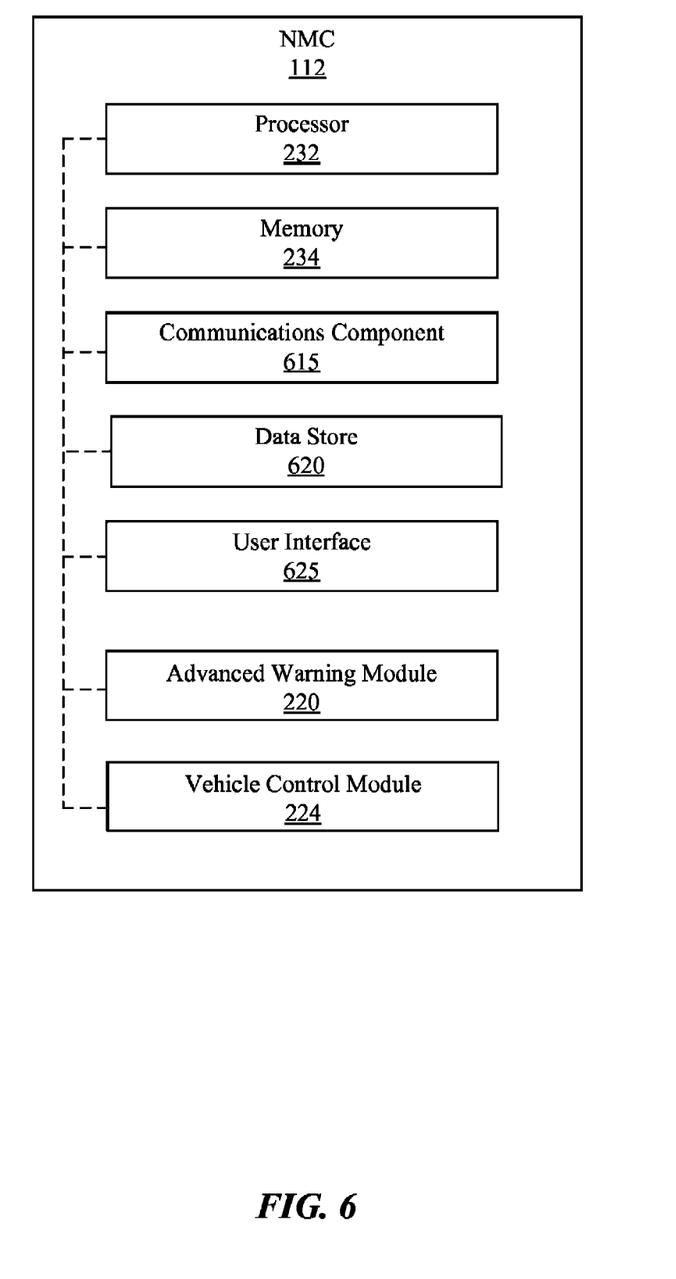
FIG. 6 is a block diagram of an example of an aspect of a network management center (NMC) in accordance with the present disclosure.

Referring to FIG. 6, in an example that should not be construed as limiting, NMC 112 may include additional components for implementing advanced warning system and in particular for operating in conjunction with advanced warning module 220 and vehicle control module 224, which may be implemented in specially programmed computer readable instructions or code, firmware, hardware, or some combination thereof.

In an aspect, the features of advanced warning module 220 and vehicle control module 224 described herein may be implemented in or executed using one or any combination of processor 232, memory 234, communications component 615, and data store 620. For example, advanced warning module 220 and vehicle control module 224 may be defined or otherwise programmed as one or more processor modules of processor 232. Further, for example, advanced warning module 220 and vehicle control module 224 may be defined as a computer-readable medium (e.g., a non-transitory computer-readable medium) stored in memory 234 and/or data store 610 and executed by processor 232. Moreover, for example, inputs and outputs relating to operations of advanced warning module 220 and vehicle control module 224 may be provided or supported by communications component 615, which may provide a bus between the components/modules of NMC 112 or an interface for communication with external devices or components/modules.

Processor 232 can include a single or multiple set of processors or multi-core processors. Moreover, processor 232 can be implemented as an integrated processing system and/or a distributed processing system.

Memory 234 may be operable for storing and retrieving data used herein and/or local versions of applications and/or software and/or instructions or code being executed by processor 232, such as to perform the respective functions of the respective entities described herein. Memory 234 can include any type of memory usable by a computer, such as random access memory (RAM), read only memory (ROM), tapes, magnetic discs, optical discs, volatile memory, non-volatile memory, and any combination thereof.

Communications component 615 may be operable to establish and maintain communications with one or more internal components/modules and/or external devices utilizing hardware, software, and services as described herein. Communications component 615 may carry communications between modules on NMC 112, as well as between user and external devices, such as devices located across a communications network and/or devices serially or locally connected to NMC 112. For example, communications component 615 may include one or more buses, and may further include transmit chain modules and receive chain modules associated with a transmitter and receiver, respectively, or a transceiver, operable for interfacing with external devices.

Additionally, data store 620, which can be any suitable combination of hardware and/or software, which provides for mass storage of information, databases, and programs employed in connection with aspects described herein. For example, data store 620 may be a data repository for applications not currently being executed by processor 232.

NMC 112 may additionally include a user interface module 625 operable to receive inputs from a user, and further operable to generate outputs for presentation to the user. User interface module 625 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 626 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of providing an advanced warning to a vehicle, comprising:
   receiving, at a network device, one or more parameters from a first mobile computing platform (MCP) associated with a first vehicle;
   determining, at the network device, a traffic condition based on the one or more parameters;
   assigning, to the traffic condition, a confidence factor identifying a level of confidence that the network device has that the traffic condition is a hazardous condition;
   identifying a second MCP associated with a second vehicle within a proximity threshold to the first vehicle; and
   transmitting a warning notification to the second MCP based on the confidence factor, wherein the warning notification includes information regarding the traffic condition.

2. The method of claim 1, wherein determining the traffic condition based on the one or more parameters comprises:
   identifying a location of the traffic condition; and
   estimating a severity level of the traffic condition based on the one or more parameters.

3. The method of claim 2, wherein the transmitting the warning notification to the second MCP comprises:
   determining whether the severity level of the traffic condition satisfies a severity threshold; and
   transmitting the warning notification to the second MCP if the severity level of the traffic condition exceeds the severity threshold.

4. The method of claim 1, further comprising:
   identifying a number of MCPs reporting at least one abnormal operating condition within the proximity of the first vehicle;
   determining whether the number of MCPs reporting at least one abnormal operating condition satisfies a threshold; and
   increasing the confidence factor based on the determining that the number of MCPs reporting at least one abnormal operating condition satisfies the threshold.

5. The method of claim 1, further comprising:
   determining weather conditions at a location of the first vehicle; and
   increasing the confidence factor based on the weather conditions.

6. The method of claim 1, further comprising:
   receiving information regarding the traffic condition from an alternative source, wherein the alternative source comprises at least one of a government vehicle, a traffic report, a traffic camera, automated highway status report or news report; and
   adjusting the confidence factor for the traffic condition based on the information.

7. The method of claim 1, further comprising:
   receiving the one or more parameters from a plurality of MCPs within the proximity threshold of the first vehicle, wherein the one or more parameters report at least one abnormal operating condition; and
   determining a severity level based on a number of the plurality of MCPs reporting the at least one abnormal operating condition.

8. The method of claim 1, further comprising:
   monitoring, at the network device, driving activity of the second vehicle; determining whether the second vehicle has responded to the warning notification based on the driving activity; and
   transmitting an urgent notification to the second MCP in response to determining that the second vehicle has not responded to the warning notification.

9. The method of claim 1, further comprising:
   transmitting, from the network device, a control signal to the second MCP, wherein the control signal overrides at least one driving capability of the second vehicle.

10. The method of claim 1, wherein the receiving of the one or more parameters further comprises receiving one or more parameters selected from a group consisting of: speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pre-tensioner deployment forward vision system input, depressed driver emergency button, tire-pressure monitoring system, automatic traction control, and a biometric parameter of a driver.

11. The method of claim 1, wherein the transmitting of the warning notification including the information regarding the traffic condition comprises transmitting at least one of a location of the traffic condition, a severity of the traffic condition, the confidence factor of the traffic condition, an estimated delay associated with the traffic condition, or an alternative route.

12. The method of claim 1, wherein the determining of the traffic condition comprises determining an accident or a roadway impediment on a highway.

13. The method of claim 1, wherein transmitting the warning notification to the second MCP comprises transmitting the warning notification from the first MCP to the second MCP in a peer-to-peer (P2P) communication.

14. An apparatus for providing an advanced warning to a vehicle, comprising:
a processor;
a memory coupled to the processor, wherein the memory includes instructions executable by the processor to:
receive, at a network device, one or more parameters from a first mobile computing platform (MCP) associated with a first vehicle;
determine, at the network device, a traffic condition base on the one or more parameters;
assign, to the traffic condition, a confidence factor identifying a level of confidence that the network device has that the traffic condition is a hazardous condition;
identify a second MCP associated with a second vehicle and
transmit a warning notification to the second MCP based on the confidence factor, wherein the warning notification includes information regarding the traffic condition.

15. The apparatus of claim 14, wherein the instructions are further executable by the processor to:
identify a location of the traffic condition; and
estimate a severity level of the traffic condition based on the one or more parameters.

16. The apparatus of claim 15, wherein the instructions are further executable by the processor to:
determine whether the severity level of the traffic condition satisfies a severity threshold; and
transmit the warning notification to the second MCP if the severity level of the traffic condition exceeds the severity threshold.

17. The apparatus of claim 14, wherein the one or more parameters are selected from a group consisting of: speed, deceleration, braking, air bag deployment, 4-way flashers, revolutions per minute (RPM), windshield wiper, fog lights, steering input, location, direction of travel, wind speed, engine oil pressure, coolant level, pull-down seat deployment, seat belt pre-tensioner deployment forward vision system input, depressed driver emergency button, tire-pressure monitoring system, automatic traction control, and a biometric parameter of a driver.

18. A non-transitory computer readable medium for providing an advanced warning to a vehicle, wherein the computer readable medium comprises code for:
receiving, at a network device, one or more parameters from a first mobile computing platform (MCP) associated with a first vehicle;
determining, at the network device, a traffic condition based on the one or more parameters;
assigning, to the traffic condition, a confidence factor identifying a level of confidence that the network device has that the traffic condition is a hazardous condition;
identifying a second MCP associated with a second vehicle within a proximity threshold to the first vehicle; and
transmitting a warning notification to the second MCP based on the confidence factor, wherein the warning notification includes information regarding the traffic condition.

19. The method of claim 1, wherein the transmitting the warning notification to the second MCP based on the confidence factor further comprises:
determining whether the confidence factor satisfices a confidence threshold; and
transmitting the warning notification to the second MCP if the confidence factor exceeds the confidence threshold.

20. The apparatus of claim 14, wherein the transmit the warning notification to the second MCP based on the confidence factor further comprises:
determine whether the confidence factor satisfices a confidence threshold; and
transmit the warning notification to the second MCP if the confidence factor exceeds the confidence threshold.

21. The non-transitory computer readable medium of claim 18, wherein the transmitting the warning notification to the second MCP based on the confidence factor further comprises:
determining whether the confidence factor satisfices a confidence threshold; and
transmitting the warning notification to the second MCP if the confidence factor exceeds the confidence threshold.

* * * * *